United States Patent
You et al.

(10) Patent No.: US 8,225,090 B2
(45) Date of Patent: Jul. 17, 2012

(54) METHOD AND APPARATUS FOR INSERTING AUTHENTICATION CODE, AND METHOD AND APPARATUS FOR USING DATA THROUGH AUTHENTICATION

(75) Inventors: Yong-kuk You, Seoul (KR); Yao Jun, Suwon-si (KR); Choong-hoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 11/873,570

(22) Filed: Oct. 17, 2007

(65) Prior Publication Data

US 2008/0133909 A1     Jun. 5, 2008

Related U.S. Application Data

(60) Provisional application No. 60/872,506, filed on Dec. 4, 2006.

(30) Foreign Application Priority Data

Mar. 29, 2007    (KR) ........................ 10-2007-0031139

(51) Int. Cl.
*H04L 29/06* (2006.01)
*H04L 9/32* (2006.01)
*G06F 11/30* (2006.01)
*G06F 12/14* (2006.01)

(52) U.S. Cl. ......... 713/161; 713/171; 713/182; 713/193

(58) Field of Classification Search .................. None
See application file for complete search history.

(56) References Cited

U.S. PATENT DOCUMENTS

| | | |
|---|---|---|
| 2003/0110377 A1 | 6/2003 | Chapman |
| 2004/0172550 A1* | 9/2004 | Sai ................. 713/193 |
| 2004/0243536 A1* | 12/2004 | Jensen et al. ............ 707/1 |
| 2006/0031327 A1* | 2/2006 | Kredo ............ 709/206 |
| 2006/0041752 A1* | 2/2006 | Tuvell et al. .......... 713/171 |
| 2006/0059111 A1* | 3/2006 | Tucker et al. ........... 705/75 |
| 2006/0126848 A1 | 6/2006 | Park et al. |
| 2006/0136715 A1 | 6/2006 | Soo |
| 2007/0016795 A1* | 1/2007 | Asano ................. 713/182 |

FOREIGN PATENT DOCUMENTS

| | | |
|---|---|---|
| KR | 10-2006-0118247 A | 11/2006 |
| WO | 2006-098552 A1 | 9/2006 |

OTHER PUBLICATIONS

Menezes, A.J., et al., "Chapter 9. Hash Functions and Data Integrity," Handbook of Applied Cryptography, 1997, p. 321-383, CRC Press.
Communication dated Feb. 2, 2011 issued by the European Patent Office in European Application No. 07833941.3.
Communication dated May 8, 2012 issued by the European Patent Office in counterpart European Patent Application No. 07833941.3.

* cited by examiner

*Primary Examiner* — Shin-Hon Chen
(74) *Attorney, Agent, or Firm* — Sughrue Mion, PLLC

(57) ABSTRACT

Provided is a method of inserting authentication code into a data packet. The method includes determining whether to insert authentication code into a data packet based on at least one of an importance of the data packet and a type of the data packet, and inserting the authentication code into the data packet based on a result of the determining.

32 Claims, 2 Drawing Sheets

METHOD AND APPARATUS FOR INSERTING AUTHENTICATION CODE, AND METHOD AND APPARATUS FOR USING DATA THROUGH AUTHENTICATION

CROSS-REFERENCE TO RELATED PATENT APPLICATIONS

This application claims priority from U.S. Provisional Application No. 60/872,506, filed on Dec. 4, 2006, in the USPTO, and Korean Patent Application No. 10-2007-0031139, filed on Mar. 29, 2007, in the Korean Intellectual Property Office, the disclosures of which are incorporated herein in their entirety by reference.

BACKGROUND OF THE INVENTION

1. Field of the Invention

Apparatuses and methods consistent with the present invention relate to inserting authentication code, and using data through authentication.

2. Description of the Related Art

There is a growing need for transmitting and receiving uncompressed audio/video (AV) data via a wireless transceiver system with a transmission rate of several Gbps, using a frequency band of several tens of GHz.

In this case, encryption must be performed to protect content. In such an environment, a stream encrypting algorithm is more desirable than a block encrypting algorithm, since it guarantees high-speed transmission.

According to the stream encrypting algorithm, a cryptogram is obtained by generating a key stream which is a random number bitstream and performing an exclusive OR (XOR) operation on plain text data in units of bits.

For example, a transmitting side makes a cryptogram C(=P XOR K) by performing an XOR operation on plain text P and a key stream K, and transmits the cryptogram C to a receiving side. Then, the receiving side derives the plain text P(=C XOR K) by performing the XOR operation on the cryptogram C and the key stream K.

However, the above feature of the stream encrypting algorithm enables an attacker to easily forge the original plain text P during transmission of the cryptogram C. That is, if the attacker simply performs the XOR operation on P' during the transmission of the cryptogram C, the receiving side receives C'=C XOR P' instead of the cryptogram C and obtains P XOR P' instead of the original plain text P, as shown in the following equation:

$$C' \text{ XOR } K = C \text{ XOR } P' \text{ XOR } K = P \text{ XOR } K \text{ XOR } P' \text{ XOR } K = P \text{ XOR } P'$$

Thus, in order to prevent such easy forgery, an authentication value may be inserted into data that is to be transmitted. That is, it is possible to determine whether the data is not forged during transmission of the data by checking the authentication value. To this end, various methods may be used. For example, a Hash value using a secret key, such as Message Authentication Code (MAC), may be inserted into the data. That is, even if an attacker forges the original data, the attacker cannot make an authentication value for the forged data when the attacker does not know a secret key K, thereby protecting the original data. In the block encrypting algorithm, an authentication value can also be inserted into data in order to prevent the data from being forged.

However, in some cases, use of an authentication value may be undesirable. For example, if a message that is to be transmitted is uncompressed high-definition data, the data must be transmitted at a very high speed, e.g., at a speed of several Gbps. Thus, when a transmitting/receiving error occurs that cannot be completely corrected, it would be better to use the data. However, when a data authentication value is used, even if a one-bit error occurs, the whole data may be discarded.

In contrast, in the case of compressed data, important information, such as copy control information, may be included in the data, and the copy control information may be in a 'copy never' state. In this case, if a data authentication value is not used, it is possible to easily forge the bits of the copy control information.

As described above, in the related art, insertion or non-insertion of an authentication value into the whole data is done irrespective of the type of the data, thereby preventing the data from being efficiently authenticated.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for inserting authentication code into data in order to effectively authenticate the data, and a method and apparatus for using data through authentication.

According to an aspect of the present invention, there is provided a method of inserting authentication code, the method comprising determining whether to insert authentication code into a data packet, based on at least one of the importance and type of the data packet, the authentication code being used to determine whether the data packet is altered; and selectively inserting the authentication code into the data packet, based on the determination.

The determining of whether to insert the authentication code may include determining whether to insert the authentication code, based on a database that stores information indicating that whether to insert the authentication code is to be determined based on at least one of the importance and type of the data packet, or criteria for determining whether to insert the authentication code.

The data packet may include an authentication code insertion indicating region in a header of the data packet, which indicates whether the authentication code is inserted into the data packet.

The method may further include generating an encryption key using the header of the data packet that includes the authentication code insertion indicating region, and encrypting the data packet using the encryption key.

The method may further include encrypting the data packet using an encryption algorithm selected depending on whether the authentication code is inserted into the data packet.

The determining of whether to insert the authentication code may include determining that the authentication code is to be inserted into the data packet when the importance of the data packet is high, and that the authentication code is not to be inserted when the importance of the data packet is not high.

The determining of whether to insert the authentication code may include determining that the authentication code is to be inserted into the data packet when the data packet is a compressed data packet, and that the authentication code is not to be inserted when the data packet is an uncompressed data packet.

The authentication code may be cyclic redundancy checking code encrypted using a secret key.

The authentication code may be generated using a HASH function encrypted by secret key or using an MAC function generated using a secret key.

According to another aspect of the present invention, there is provided a method of using data through authentication, the method comprising receiving a data packet, and determining whether authentication code is inserted into the data packet, the authentication code being used to determine whether the data packet is altered; selectively authenticating whether the data packet is altered, based on the result of determining whether the authentication code is inserted; and selectively using the data packet, based on whether the data packet is authenticated and the result of authenticating the data packet.

The determining of whether authentication code is inserted may include determining whether the authentication code is inserted, based on a database that stores information indicating that whether to insert the authentication code is to be determined based on at least one of the importance and type of the data packet, or criteria for determining whether the authentication code is stored.

The determining of whether authentication code is inserted may include determining whether the authentication code is inserted, based on an authentication code insertion indicating region of a header of the data packet, which indicates whether the authentication code is inserted into the data packet.

The determining of whether authentication code is inserted may include determining whether the authentication code is inserted, based on the type of an algorithm used to encrypt the data packet.

The method may further include if the received data packet contains an error, receiving the original data packet corresponding to the data packet that contains the error again.

The receiving of the original data packet may comprise receiving the original data packet again while changing the number of times the data packet is received depending on whether the authentication code is inserted into the data packet.

The selectively authenticating of whether the data packet is altered may include performing authentication when it is determined that the authentication code is inserted into the data packet, and skipping the performing of the authentication when it is determined that the authentication code has not been inserted.

The selectively using of the data packet may include using the data packet only when the data packet has not been authenticated or the authentication of the data packet reveals that the data packet has not been altered.

According to another aspect of the present invention, there is provided an apparatus for inserting authentication code, the apparatus comprising an authentication code insertion determining unit determining whether to insert authentication code into a data packet based on at least one of the importance and type of the data packet, the authentication code being used to determine whether the data packet is altered; and an authentication code inserting unit selectively inserting the authentication code into the data packet, based on the determination.

The apparatus may further include an encryption unit generating an encryption key using the header of the data packet, which includes the authentication code insertion indicating region, and encrypting the data packet using the encryption key.

According to another aspect of the present invention, there is provided an apparatus for using data through authentication, the apparatus comprising a receiving unit receiving a data packet; an authentication code insertion determining unit determining whether authentication code is inserted into the data packet, the authentication code being used to determine whether the data packet is altered; an authenticating unit selectively authenticating whether the data packet is altered, based on the determination; and a data using unit selectively using the data packet depending on whether the authentication is performed and the result of authenticating whether the data packet is altered.

The apparatus may further include an error detector detecting whether an error occurs in the data packet, and wherein the receiving unit receives the original data packet corresponding to the data packet that contains the error again when the data packet contains an error.

According to another aspect of the present invention, there is provided a computer readable medium having recorded thereon a program for executing a method of conditionally inserting authentication code, the method comprising determining whether to insert authentication code into a data packet, based on at least one of the importance and type of the data packet, the authentication code being used to determine whether the data packet is altered; and selectively inserting the authentication code into the data packet, based on the determination.

According to another aspect of the present invention, there is provided a computer readable medium having recorded thereon a program for executing a method of conditionally using data through authentication, the method comprising receiving a data packet, and determining whether authentication code is inserted into the data packet, the authentication code being used to determine whether the data packet is altered; selectively authenticating whether the data packet is altered, based on the result of determining whether the authentication code is inserted; and selectively using the data packet, based on whether the data packet is authenticated and the result of authenticating the data packet.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
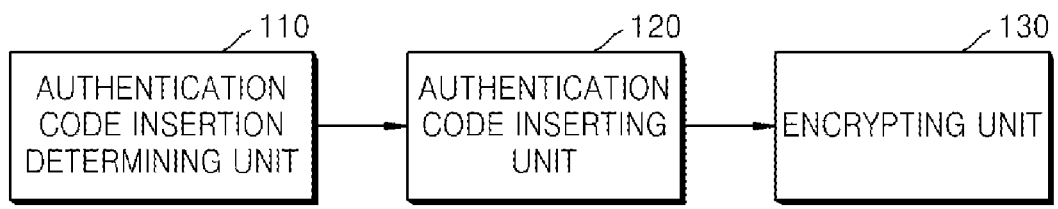
FIG. 1 is a block diagram of an apparatus for conditionally inserting authentication code, according to an exemplary embodiment of the present invention.

The present invention will now be described more fully with reference to the accompanying drawings, in which exemplary embodiments of the invention are shown. Like reference numerals denote like elements throughout the drawings.

FIG. 1 is a block diagram of an apparatus for conditionally inserting authentication code, according to an exemplary embodiment of the present invention. Referring to FIG. 1, the apparatus includes an authentication code insertion determining unit 110, an authentication code inserting unit 120, and an encrypting unit 130.

The authentication code insertion determining unit 110 determines whether to insert authentication code into a data packet based on at least one of the importance and type of the data packet. The authentication code is used to determine whether the data packet has been altered.

The authentication code may be cyclic redundancy checking (CRC) code encrypted using a secret key, or may be generated using a HASH function encrypted by secret key or using an MAC function generated using a secret key. Also, the authentication code may be constructed in various ways. The reason why data encrypted using a secret key is used as the authentication code is to prevent a third party from altering the authentication code.

The authentication code insertion determining unit 110 may determine that the authentication code is to be inserted into the data packet when the importance of the data packet is a predetermined level. For example, the authentication code insertion determining unit 110 may determine that the authentication code is to be inserted into the data packet when the importance of the data packet is high, and that the authentication code is not to be inserted into the data packet when the importance of the data packet is not high.

Also, the authentication code insertion determining unit 110 may determine that the authentication code is to be inserted into the data packet if the data packet is compressed, and that the authentication code is not to be inserted if the data packet is not compressed.

The reason why the authentication code is not inserted into an uncompressed data packet will now be described. For example, in the case of an uncompressed AV data packet, if the data packet is not used since part of the data packet is altered, no image is temporarily displayed on a display. That is, even if a part of the data packet is altered, it is more desirable to display a partly altered image, than to display no image at all.

In this case, the authentication code insertion determining unit 110 may determine whether to insert the authentication code into the data packet, based on a database (not shown) that stores information that indicates whether to insert the authentication code is to be determined according to at least one of the importance and type of the data packet, or criteria for determining whether to insert the authentication code.

The database stores information on the importance and type of data packet so that the authentication code can be inserted according to criteria set by a user, and the criteria may be freely changed by the user.

Alternatively, the user can check the importance and type of the data packet and determine whether to insert the authentication code by himself or herself. In this case, the authentication code insertion determining unit 110 may be omitted.

The authentication code inserting unit 120 selectively inserts the authentication code into the data packet, based on the determination made by the authentication code insertion determining unit 110.

The data packet into which the authentication code is inserted by the authentication code inserting unit 120, may be expressed as follows:

$$\text{Data/Authentication Code} \qquad (2)$$

As described above, the authentication code may be CRC code encrypted using a secret key, or may be generated using a HASH function encrypted by secret key or using an MAC function generated using a secret key.

In the current exemplary embodiment, an authentication code insertion indicating region representing whether the authentication code is inserted into the data packet, may be inserted into a header of the data packet.

For example, the authentication code inserting unit 120 may mark '1' in the authentication code insertion indicating region when the authentication code is inserted into the data packet, and mark '0' in the authentication code insertion indicating region when the authentication code is not inserted.

Also, the authentication code inserting unit 120 may make any mark in the data packet or add predetermined data to the data packet when the authentication code is inserted into the data packet but may not make any mark in the data packet when the authentication code is not inserted.

The encrypting unit 130 generates an encryption key using the header of the data packet, which includes the authentication code insertion indicating region, and encrypts the data packet using the encryption key, thereby preventing the mark in the authentication code insertion indicating region from being altered by a third party.

That is, if a receiving side generates a decryption key using the header of the data packet and decrypts the encrypted data packet using the decryption key, altering of the authentication code insertion indicating region of the header of the data packet causes the decryption key to be different from the encryption key. Thus, the encrypted data packet cannot be decrypted, and therefore, it is possible to recognize that the header of the data packet has been altered. Since the header of the data packet is used as information for generating the decryption key, it is directly transmitted to the receiving side without being encrypted.

In this way, the receiving side prevents a third party from altering the mark in the authentication code insertion indicating region of the data packet. However, a method of preventing the mark in the authentication code insertion indicating region from being altered is not limited to the method described above.

Also, the encrypting unit 130 is capable of encrypting the data packet using an encryption algorithm selected depending on whether the authentication code is inserted into the data packet. For example, if the authentication code is inserted into the data packet, the data packet may be encrypted using an Advanced Encryption Standard (AES) CBC mode algorithm. If the authentication code is not inserted into the data packet, the data packet may be encrypted using an AES counter mode algorithm.

The data packet is encrypted using an encryption algorithm selected depending on whether the authentication code is inserted into the data packet, so that the receiving side can recognize whether the authentication code has been inserted into the data packet by simply checking the type of the encryption algorithm used.

That is, in the above example, if the data packet has been encrypted using the AES CBC mode algorithm, the receiving side can recognize that the authentication code has been inserted into the data packet, and if the data packet has been encrypted using the AES counter mode algorithm, the receiving side can recognize that the authentication code has not been inserted.

However, the encryption algorithm is not limited to the AES CBC mode algorithm and the AES counter mode algorithm.

According to another exemplary embodiment of the present invention, the encrypting unit 130 may be omitted.

Figure 2:
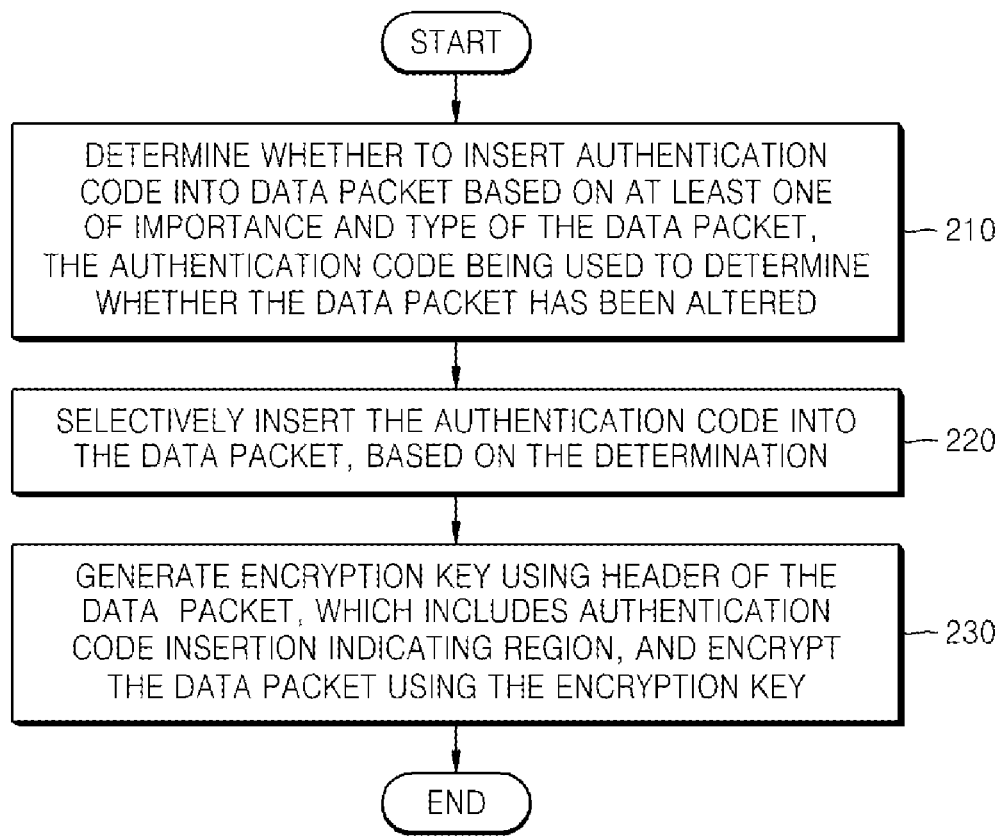
FIG. 2 is a flowchart illustrating a method of conditionally inserting authentication code, according to an exemplary embodiment of the present invention.

FIG. 2 is a flowchart illustrating a method of conditionally inserting authentication code, according to an exemplary embodiment of the present invention. In operation 210, it is determined whether to insert the authentication code into a data packet based on at least one of the importance and type of the data packet, the authentication code being used to determine whether the data packet has been altered.

In operation 220, the authentication code is selectively inserted into the data packet, based on the determination.

In operation 230, an encryption key is generated using a header of the data packet, which includes an authentication code insertion indicating region, and the data packet is encrypted using the encryption key.

If another method of preventing a mark in the authentication code insertion indicating region from being altered is available, operation 230 may be replaced with this method. Also, the order of operations 220 and 230 may be switched depending on the type of authentication. That is, the authentication code may be added to the data packet after the data packet is encrypted.

Figure 3:
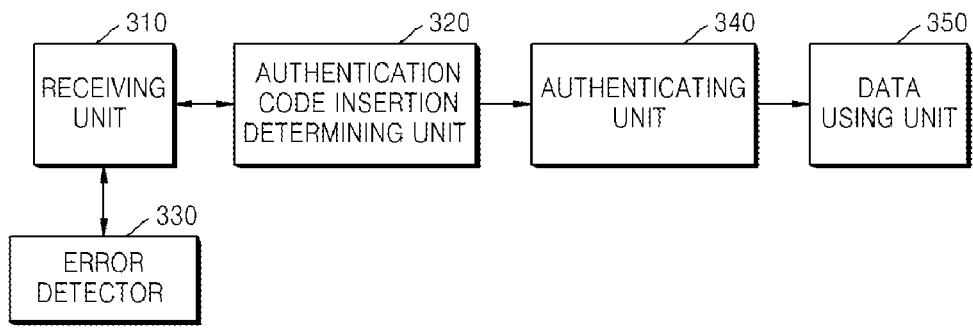
FIG. 3 is a block diagram of an apparatus for conditionally using data, according to an exemplary embodiment of the present invention.

FIG. 3 is a block diagram of an apparatus for using data through authentication, according to an exemplary embodiment of the present invention. Referring to FIG. 3, the apparatus includes a receiving unit 310, an authentication code insertion determining unit 320, an error detector 330, an authenticating unit 340, and a data using unit 350.

The receiving unit 310 receives a data packet.

The data packet may or may not be encrypted.

The authentication code insertion determining unit 320 determines whether authentication code has been inserted into the data packet, the authentication code being used to determine whether the data packet has been altered.

In this case, the authentication code insertion determining unit 320 may determine whether the authentication code has been inserted into the data packet, based on a database (not shown) that stores information indicating that whether to insert the authentication code is to be determined based on at least one of the importance and type of the data packet, or criteria for determining whether to insert the authentication code.

For example, if the database reveals that the authentication code is not to be inserted into an uncompressed data packet, the authentication code insertion determining unit 320 simply determines that the authentication code has not been inserted into the data packet when the data packet is determined to be an uncompressed data packet.

Also, the authentication code insertion determining unit 320 may determine whether the authentication code has been inserted into the data packet, based on an authentication code insertion indicating region of a header of the data packet, which indicates whether the authentication code has been inserted into the data packet.

For example, if "1" is marked in the authentication code insertion indicating region of the header of the data packet, it is possible to determine that the authentication code has been inserted into the data packet, and if "0" is marked in the authentication code insertion indicating region, it is possible to determine that the authentication code has not been inserted.

Also, the authentication code insertion determining unit 320 may determine whether the authentication code has been inserted into the data packet by checking the type of the encryption algorithm used to encrypt the data packet.

In this case, the authentication code insertion determining unit 320 may further include a decrypting unit (not shown) that decrypts the encrypted data packet.

For example, if the decrypting unit can decrypt the data packet using the AES CBC mode algorithm, it is determined that the authentication code has been inserted into the data packet, and if the decrypting unit can decrypt the data packet using the AES counter mode algorithm, it is determined that the authentication code has not been inserted.

The authenticating unit 340 selectively authenticates the data packet to determine whether the data packet been altered, based on the determination made by the authentication code insertion determining unit 320.

That is, the authenticating unit 340 may perform the authentication when it is determined that the authentication code has been inserted into the data packet, and skip performing the authentication when it is determined that the authentication code has not been inserted.

The error detector 330 detects whether an error occurs in the data packet received from the receiving unit 310.

If the error detector 330 detects an error in the data packet, the receiving unit 310 receives the original data packet corresponding to the data packet that contains the error again.

In this case, the receiving unit 310 receives the original data packet while changing the number of times that the data packet is received according to whether the authentication code has been inserted into the data packet.

That is, if the error detector 330 recognizes that an error occurs in the data packet, the receiving unit 310 determines whether the authentication code has been inserted into the data packet according to the determination made by the authentication code insertion determining unit 320, and then, determines the number of times that the original data packet is received again.

For example, if the data packet with the error is determined to be an important data packet into which the authentication code has been inserted, the original data packet corresponding to the data packet containing the error may be received again until a data packet with no error is received. However, if the data packet with the error is determined to be an uncompressed AV data into which an authentication code has not been inserted, the data packet may be directly used without receiving the original data packet corresponding to the data packet containing the error again.

The data using unit 350 selectively uses the data packet, according to whether the authentication is performed and the result of performing the authentication.

The data using unit 350 uses data packets that have not been authenticated (i.e., do not include the authentication code) or that have been determined to not be altered, and does not use the other packets.

That is, if a data packet has not been authenticated, it means that authentication is not necessary, and therefore, the data packet can be used without determining whether the data packet has been altered. The data packet can be used only if a data packet that has been authenticated is determined as being not altered.

Here, use of the data packet may be understood as displaying the data packet on a screen if the data packet is an image, or as reproducing the data packet if the data packet is audio data. If the data packet is a general data file, use of the data packet may be understood as storing the data packet.

Figure 4:
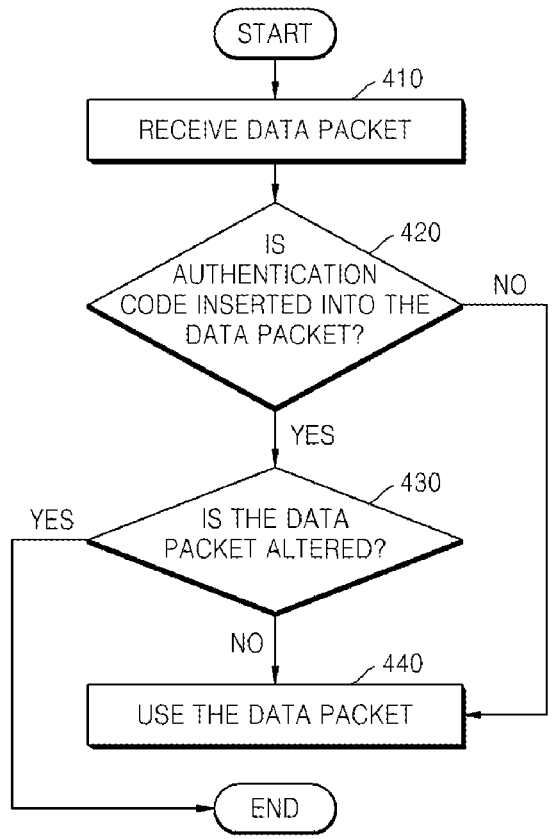
FIG. 4 is a flowchart illustrating a method of conditionally using data, according to an exemplary embodiment of the present invention.

FIG. 4 is a flowchart illustrating a method of conditionally using data, according to an exemplary embodiment of the present invention.

In operation 410, a data packet is received.

In operation 420, it is determined whether authentication code has been inserted into the data packet so as to enable determination as to whether the data packet has been altered.

In operation 430, if it is determined that the authentication code has been inserted into the data packet, it is determined whether the data packet into which the authentication code has been inserted has been altered.

In operation 440, if it is determined that the data packet has not been altered, or if it is determined that the authentication has not been inserted into the data packet, the data packet is used.

If the is determined that the data packet has been altered, the data using unit 350 of FIG. 3 does not use the data packet.

The above exemplary embodiments of the present invention may be embodied as a computer program. Code and code segments of the computer program may be easily derived by computer programmers skilled in the art to which the present invention pertains. The computer program may be stored in a computer readable medium, and executed using a general digital computer. Examples of the computer-readable medium include a magnetic recording medium (e.g., a read only memory (ROM), a floppy disk, a hard disc, etc.), or an optical recording medium (e.g., a compact disc (CD) ROM, a digital versatile disc (DVD), etc.).

According to the present invention, it is determined whether to insert authentication code into a data packet based on at least one of the importance and type of the data packet, the authentication code being used to determine whether the data packet has been altered, and the authentication code is selectively inserted into the data packet based on the determination, thereby effectively authenticating the data packet.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of inserting authentication code, the method comprising:
   determining whether to insert authentication code into a data packet, based on at least one of an importance of the data packet and a type of the data packet;
   selectively inserting the authentication code into the data packet, based on a result of the determining; and
   encrypting the data packet using an encryption algorithm selected based on whether the authentication code is inserted into the data packet,
   wherein the importance of the data packet and the type of the data packet are stored in a database.

2. The method of claim 1, wherein the determining whether to insert the authentication code is further based on information which is stored in the database and indicates whether to insert the authentication code is to be determined based on the at least one of the importance of the data packet and the type of the data packet.

3. The method of claim 1, further comprising generating an encryption key using a header of the data packet, and encrypting the data packet using the encryption key, wherein the data packet comprises the header which includes an authentication code insertion indicating region which indicates whether the authentication code is inserted into the data packet.

4. The method of claim 1, wherein the determining whether to insert the authentication code comprises determining that the authentication code is to be inserted into the data packet if the importance of the data packet corresponds a predetermined level or the type of the data packet is a compressed data packet, and that the authentication code is not to be inserted if the importance of the data packet does not correspond to the predetermined level.

5. The method of claim 1, wherein the authentication code is cyclic redundancy checking code encrypted using a secret key or is generated using a HASH function encrypted by secret key or using a message authentication code function generated using a secret key.

6. A non-transitory computer readable medium having recorded thereon a program for executing the method of claim 1.

7. The method of claim 1, wherein the importance of the data packet indicates whether the data packet is a compressed data packet or an uncompressed data packet.

8. The method of claim 1, wherein a receiving side recognizes whether the authentication code is inserted in to the data packet based on a type of an encryption algorithm.

9. A method of using data, the method comprising:
   determining whether authentication code is inserted into a data packet that is received based on a type of an algorithm used to encrypt the data packet;
   selectively determining whether the data packet is altered, based on a result of the determining whether the authentication code is inserted into the data packet; and
   using the data packet, based on a result of the determining whether the data packet is altered,
   wherein the authentication code is selectively inserted into the data packet based on the importance and type of the data packet, and
   wherein the importance of the data packet and the type of the data packet are stored in a database.

10. The method of claim 9, wherein the determining whether authentication code is inserted comprises determining whether the authentication code is inserted, based on a information which is stored in the database and indicates that whether to insert the authentication code is to be determined based on at least one of the importance and type of the data packet.

11. The method of claim 9, further comprising, if the received data packet contains an error, receiving another data packet corresponding to the data packet that contains the error, wherein the receiving of another data packet comprises receiving the other data packet while changing a number of times the data packet is received.

12. The method of claim 9, wherein determining whether the data packet is altered comprises determining whether the data packet is altered if it is determined that the authentication code is inserted into the data packet, and skipping the determining whether the packet is altered if it is determined that the authentication code has not been inserted into the data packet.

13. The method of claim 9, wherein the using the data packet comprises using the data packet if it is determined that the data packet has not been altered or if it is determined that the authentication code is not inserted in the data packet.

14. A non-transitory computer readable medium having recorded thereon a program for executing the method of claim 9.

15. The method of claim 9, wherein the importance of the data packet indicates whether the data packet is a compressed data packet or an uncompressed data packet.

16. A method of using data, the method comprising:
   determining whether authentication code is inserted into a data packet based on an authentication code insertion indicating region of a header of the data packet, which indicates whether the authentication code is inserted into the data packet;
   selectively determining whether the data packet is altered, based on a result of the determining whether the authentication code is inserted into the data packet; and
   using the data packet, based on a result of the determining whether the data packet is altered,
   wherein the authentication code is selectively inserted into the data packet based on the importance and type of the data packet, wherein the importance of the data packet and the type of the data packet are stored in a database, and wherein the data packet is encrypted using an encryption algorithm selected based on whether the authentication code is inserted into the data packet.

17. The method of claim 16, wherein a receiving side recognizes whether the authentication code is inserted in to the data packet based on a type of an encryption algorithm.

18. An apparatus for inserting authentication code, the apparatus comprising:
   an authentication code insertion determining unit which determines whether to insert authentication code into a data packet based on at least one of an importance of the data packet and a type of the data packet;
   an authentication code inserting unit which inserts the authentication code into the data packet, based on a result of the determination by the authentication code insertion determining unit; and
   an encryption unit which encrypts the data packet using an encryption algorithm selected based on whether the authentication code is inserted into the data packet,
   wherein the importance of the data packet and the type of the data packet are stored in a database.

19. The apparatus of claim 18, wherein the authentication code insertion determining unit determines whether to insert the authentication code, based on information which is stored in the database and indicates that whether to insert the authentication code is to be determined based on at least one of the importance of the data packet and the type of the data packet.

20. The apparatus of claim 18, wherein the encryption unit generates an encryption key using a header of the data packet, and encrypts the data packet using the encryption key,
   wherein the data packet comprises the header which includes an authentication code insertion indicating region which indicates whether the authentication code is inserted into the data packet, and
   the authentication code inserting unit sets at least one bit in the authentication code insertion indicating region to indicate whether the authentication code is inserted into the data packet.

21. The apparatus of claim 20, wherein a receiving side recognizes whether the authentication code is inserted in to the data packet based on a type of an encryption algorithm.

22. The apparatus of claim 18, wherein the authentication code insertion determining unit determines that the authentication code is to be inserted into the data packet if the importance of the data packet corresponds a predetermined level or the type of the data packet is a compressed data packet, and determines that the authentication code is not to be inserted if the importance of the data packet does not correspond to the predetermined level or the type of the data packet is an uncompressed data packet.

23. The apparatus of claim 18, wherein the authentication code is cyclic redundancy checking code encrypted using a secret key or is generated using a HASH function encrypted by secret key or using a message authentication code function generated using a secret key.

24. The apparatus of claim 18, wherein the importance of the data packet indicates whether the data packet is a compressed data packet or an uncompressed data packet.

25. The apparatus of claim 18, wherein a receiving side recognizes whether the authentication code is inserted in to the data packet based on a type of an encryption algorithm.

26. An apparatus for using data, the apparatus comprising:
   an authentication code insertion determining unit which determines whether authentication code is inserted into a data packet that is received based on a type of an algorithm used to encrypt the data packet;
   an authenticating unit which selectively determines whether the data packet is altered based on a result of the determination by the authentication code insertion determining unit; and
   a data using unit which uses the data packet based on a result of the determination by the authenticating unit,
   wherein the authentication code is selectively inserted into the data packet based on the importance and type of the data packet, and
   wherein the importance of the data packet and the type of the data packet are stored in a database.

27. The apparatus of claim 26, wherein the authentication code insertion determining unit determines whether the authentication code is inserted into the data packet, based on information which is stored in the database and indicates that whether to insert the authentication code is to be determined based on at least one of an importance of the data packet and a type of the data packet.

28. The apparatus of claim 26, further comprising an error detector which detects whether an error occurs in the data packet, and
   a receiving unit which receives the data packet, and if the error detector detects that the data packet contains an error, receives another data packet corresponding to the data packet that contains the error, wherein the receiving unit receives the other data packet while changing a number of times that the data packet is received.

29. The apparatus of claim 26, wherein the authenticating unit determines whether the data packet is altered if the an authentication code insertion determining unit determines that the authentication code is inserted into the data packet, and does not determine whether the data packet is altered if the authentication code insertion determining unit determines that the authentication code is not inserted into the data packet.

30. The apparatus of claim 26, wherein the data using unit uses the data packet if the authenticating unit determines that the data packet is not altered or if the authentication code insertion determining unit determines that the authentication code is not inserted into the data packet.

31. The apparatus of claim 26, wherein the importance of the data packet indicates whether the data packet is a compressed data packet or an uncompressed data packet.

32. An apparatus for using data, the apparatus comprising:
   an authentication code insertion determining unit which determines whether authentication code is inserted into a data packet that is received based on an authentication code insertion indicating region of a header of the data packet, which indicates whether the authentication code is inserted into the data packet;
   an authenticating unit which selectively determines whether the data packet is altered based on a result of the determination by the authentication code insertion determining unit; and
   a data using unit which uses the data packet based on a result of the determination by the authenticating unit,
   wherein the authentication code is selectively inserted into the data packet based on the importance and type of the data packet,
   wherein the importance of the data packet and the type of the data packet are stored in a database, and
   wherein the data packet is encrypted using an encryption algorithm selected based on whether the authentication code is inserted into the data packet.

* * * * *